Nov. 17, 1964  D. O. EASTERLY ETAL  3,157,880
CASSETTE WITH FILM REEL SENSOR
Filed Dec. 7, 1962  3 Sheets-Sheet 1

DONALD O. EASTERLY
MORRIS E. BROWN
INVENTORS

BY R. Frank Smith
Robert W. Hampton
ATTORNEYS

Nov. 17, 1964   D. O. EASTERLY ETAL   3,157,880
CASSETTE WITH FILM REEL SENSOR
Filed Dec. 7, 1962                    3 Sheets-Sheet 2
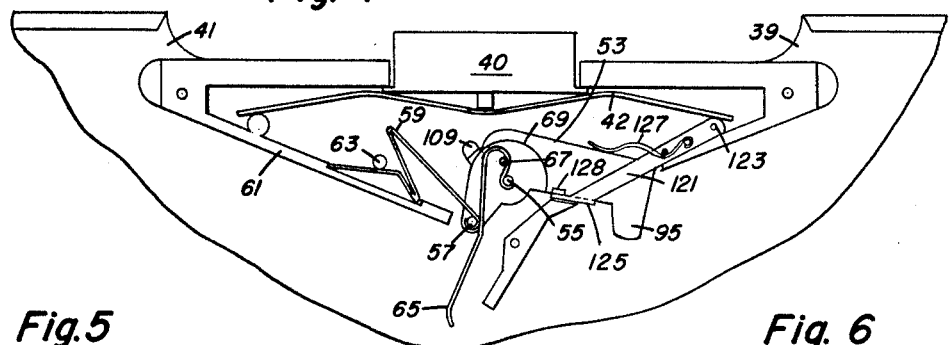
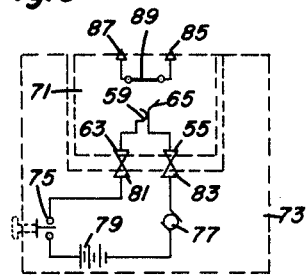
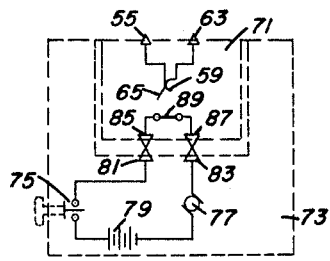
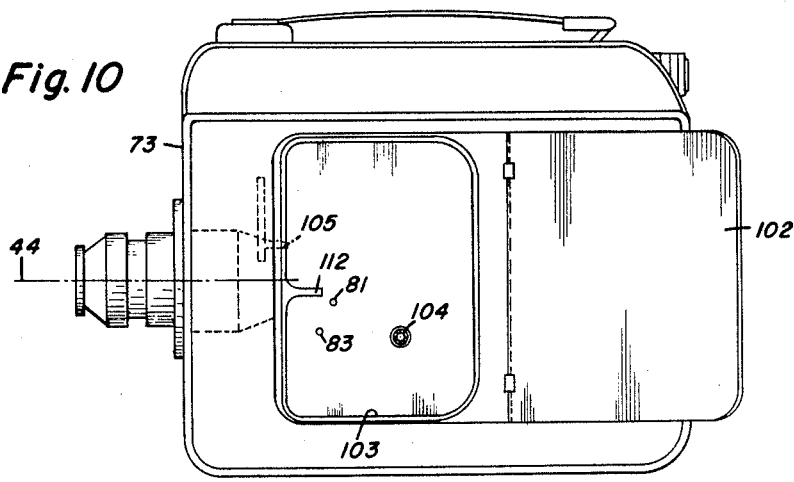
DONALD O. EASTERLY
MORRIS E. BROWN
INVENTORS
ATTORNEYS

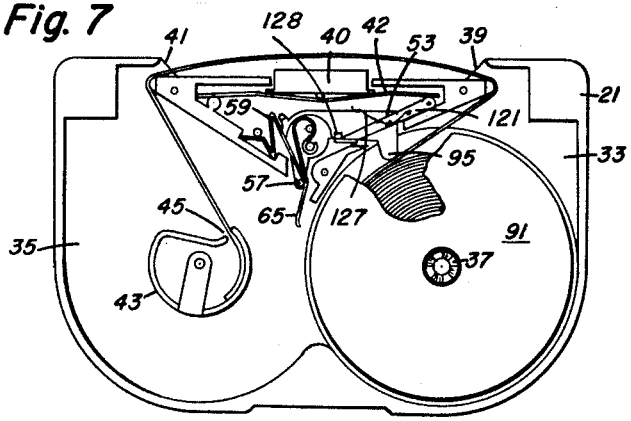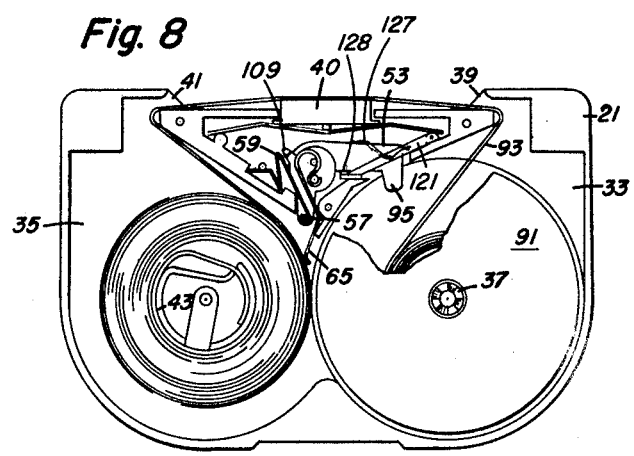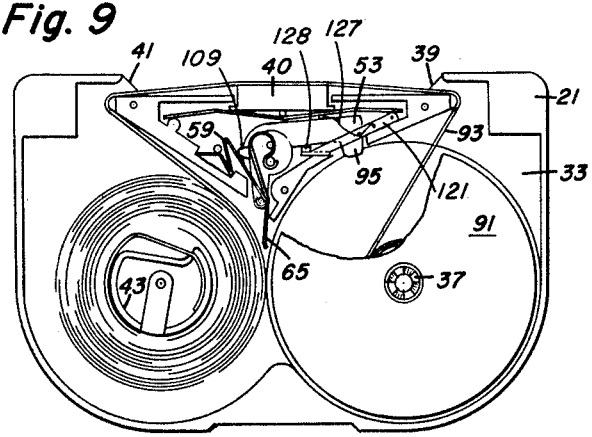

United States Patent Office 3,157,880
Patented Nov. 17, 1964

3,157,880
CASSETTE WITH FILM REEL SENSOR
Donald O. Easterly and Morris E. Brown, Rochester,
N.Y., assignors to Eastman Kodak Company, Rochester, N.Y., a corporation of New Jersey
Filed Dec. 7, 1962, Ser. No. 243,079
7 Claims. (Cl. 352—72)

This invention relates to film-holding cassettes for movie cameras and, more particularly, to an improved cassette designed for insertion into an electrically driven movie camera and including a novel arrangement for preventing run-off of the film trailer from the cassette's film supply spool.

The cassette-loading movie camera has been developed as an improvement over both reel-loading and magazine-loading cameras. With reel-loading cameras the operator must insert a spool of unexposed film and thread the latter through the camera's film drive mechanism as well as onto a take-up spool. With 8 mm. cameras, after exposure of one side of the film the operator must open the camera and reverse the positions of the take-up spool and the supply spool, rethreading the film from the take-up spool, through the camera's film drive mechanism, and back onto the supply spool. Magazine-loading cameras are simpler to handle in that the operator need only insert the magazine into the camera in a first position and, after one side of the film has been exposed, remove the magazine, turn it over, and reinsert it to expose the other side of the film. However, magazines cannot be loaded and unloaded by the operator, and the entire magazine unit must be sent to the processor when it is desired to have the film processed.

The purpose of the cassette is to provide a unit which can be simply loaded by the operator with a supply spool of unexposed film and which, once loaded and closed, can be easily inserted into the camera and handled in the same manner that the operator would handle a magazine. In addition to its magazine-like ease of operation and handling, the cassette has a major advantage over a magazine in that relatively inexpensive roll film can be used, and there is no necessity for sending back the entire cassette unit to the film processor when it is desired to have the film processed.

In order to provide these combined advantages of economy and simplicity of handling, it is essential that the operator be able to rewind the film in the cassette upon its supply spool following its exposure (16 mm.), or to place the film in the camera in reverse so that the other side of the film can be exposed as it is being rewound onto the supply spool (8 mm.). However, if, when the film is initially being exposed, it is permitted to completely unwind off the supply spool, it then becomes necessary to utilize darkroom facilities in order to rethread the film trailer back onto the supply spool so that it can be further exposed and/or rewound. The necessity for such recourse to the darkroom is highly undesirable, and the purpose of the cassette switch mechanism disclosed herein is to overcome this run-off problem.

Undesirable run-off of the trailer from the supply spool can be prevented by means of an automatic cut-off switch such as that originally disclosed by W. A. Martin in U.S. patent application Serial No. 201,034, and the subject invention is an improvement on that automatic cut-off switch mechanism. According to the Martin disclosure, the electric drive circuit of the camera must be completed through the special cut-off switch to permit operation of the electric drive motor. The switch is designed to sense the amount of film that has been received and stored in the take-up portion of the cassette and to open the camera's electric motor circuit in time to prevent run-off while still permitting the camera operator to expose the maximum amount of usable film footage. Since all film manufacturers do not provide a standard amount of film (actual footage of film in a "25-foot" spool varies as much as 3 feet), and since all movie films do not have identical thicknesses, the switch mechanism disclosed herein automatically adjusts and compensates for such differences to assure the desired run-off protection and maximum amount of usable footage for any particular type of film that may be inserted in the cassette.

In general, the particular embodiment of the improved switch mechanism disclosed herein includes a spring-biased lever having one end that protrudes into the film supply section of the cassette to sense the initial diameter of the roll of film stored upon the supply spool. At the other end of this lever is a cut-off spring which extends into the take-up portion of the cassette. This cut-off spring comprises one contact of the switch mechanism, and when the amount of film received by and stored in the take-up section of the cassette reaches a predetermined amount, the cut-off spring senses the surface of the film which causes it to move out of electrical contact with its coacting switch member, thereby opening the circuit to the camera's drive motor. The proper sensing position of the cut-off spring is determined by the initial diameter of the roll of film stored on the supply spool and sensed by the lever when the supply spool is initially placed in the cassette. Once the cut-off switch has opened, preventing further operation of the electric film drive, the operator merely opens the camera, takes out the cassette, turns it over and reinserts it in the camera. The film can then be further exposed and/or rewound by the operator, since the electric motor circuit can be again selectively closed whenever the cassette is placed in the camera in its reversed position. Further, means are provided to disengage the entire switch mechanism and its sensing members from any further contact with the surface of the film after the cassette has been reversed and reinserted in the camera for further exposure and/or rewinding purposes.

The particular portion of the switch mechanism which comprises the subject improvement concerns the means for maintaining the just described spring-biased lever in its operative, initially-sensed position. As originally conceived and disclosed, the Martin switch mechanism is not "fool-proof." If the cassette is initially inserted in its inverted (re-wind) position, the switch mechanism sensing members are moved to a disengaged position. When the cassette is properly re-inserted thereafter, the sensing members remain in the disengaged position to which they have been driven by the initial improper insertion of the cassette, and this permits the film trailer to run off the supply spool, thereby necessitating the use of darkroom facilities to rethread the film.

The improvement disclosed herein anticipates such improper initial insertion of the cassette and makes it "fool-proof" by providing freely rotatable sensing members in combination with separately secured stop means which assure the return of the sensing members to the operative position that will prevent run-off of the film trailer from the supply spool when the cassette is reinserted in its proper initial position. Also, the improvement accomplishes this additional safeguard without in any way interfering with the proper operation of the switch mechanism or the desired withdrawal of the sensing members when the cassette is properly inserted and reinserted in the camera following the exposure of one side of the film.

Therefore, it is an object of this invention to provide a new and improved film cassette for electric drive movie cameras.

A further object is to provide "fool-proofing" means whereby the initial improper insertion of the cassette into the camera will not prevent proper operation of the switch control mechanism when the cassette is thereafter reinserted in its proper initial position.

Other objects, purposes and characteristic features of the present invention will be in part obvious from the accompanying drawings, and in part pointed out as the description of the invention progresses. In describing the invention in detail, reference will be made to the accompanying drawings in which like reference characters designate corresponding parts throughout the several views, and in which:

FIG. 4 is an enlarged elevational view of one portion of the cassette showing the improved switch mechanism utilized in the particular embodiment of the invention disclosed herein;

FIGS. 5 and 6 are schematic representations of the electrical circuits involved in both the camera and the film cassette, FIG. 5 showing the cassette in its position when initially placed in the camera, and FIG. 6 illustrating the cassette when it is in its reversed position permitting the film to be rewound on the supply spool;

FIGS. 7, 8 and 9 are elevational views of the interior of the cassette, illustrating the various relative positions of the switch mechanism during actual operation, FIG. 7 illustrating the position at the time when the supply spool has just been placed in the cassette in preparation for initial exposure of the film, FIG. 8 illustrating the position of the switch members at the time the switch has opened the circuit to the electric drive motor of the camera in order to prevent run-off of the film trailer from the supply spool, and FIG. 9 illustrating the position of the switch members after the cassette has been reversed and placed back into the camera preparatory to rewinding the film on the supply spool (note: to facilitate comparison with FIGS. 7 and 8, FIG. 9 is not reversed);

FIG. 10 is an elevational view of a camera designed to receive the cassette disclosed herein, illustrating the camera with its cassette-receiving recess open and omitting parts not pertinent to the disclosure herein.

Figure 1:
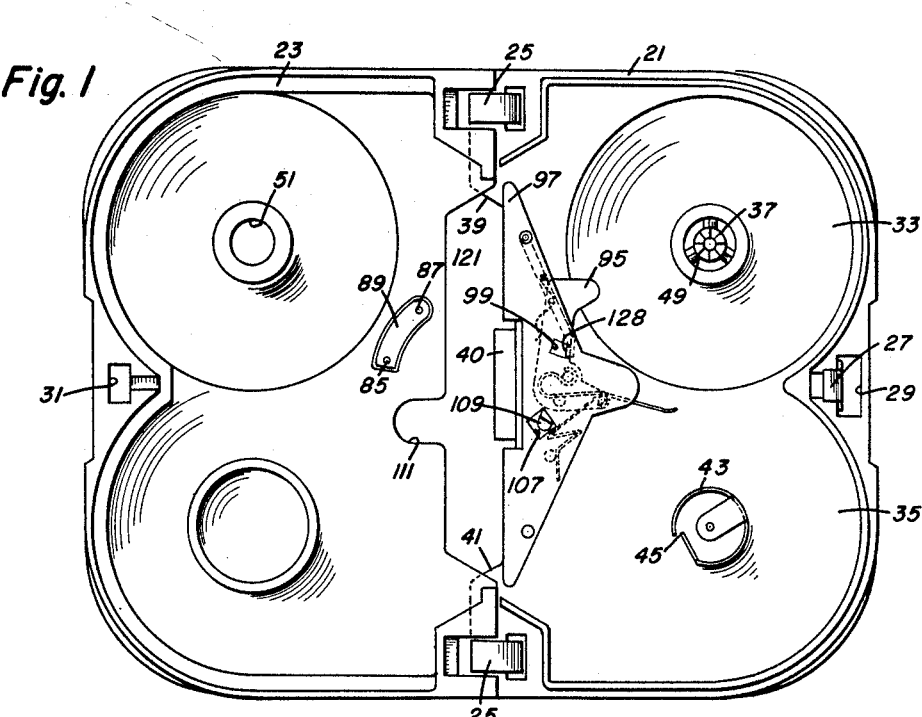
FIG. 1 is an elevational view of an open cassette showing the inside of the body and the cover of the cassette casing.
Figure 2:
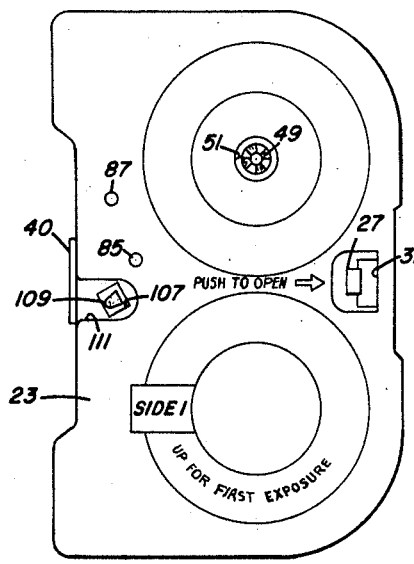
FIGS. 2 and 3 are, respectively, elevational views of the closed cassette viewed from the cover side (FIG. 2) and from the body side (FIG. 3)
Figure 3:
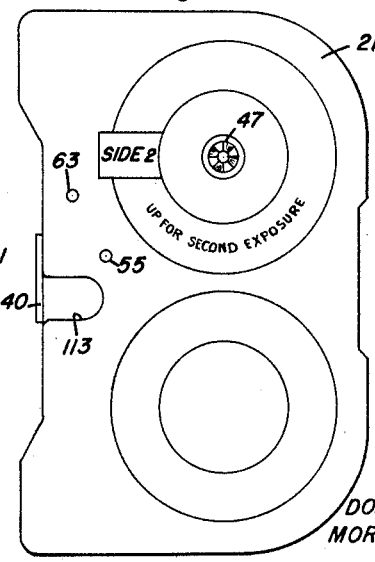

Referring now principally to FIGS. 1, 2 and 3, the casing of the cassette is made up of a body member 21 and a cover member 23. Cover member 23 is suitably attached to body member 21 by means of hinges 25. When the cover 23 is in closed relation to the body 21, it is held securely by spring latch 27 which is suitably mounted in recess 29 of body member 21 and acts in co-operation with opening 31 in cover 23 to maintain the casing members in closed relation.

The major portion of casing body 21 is divided into two recessed sections, film supply recess 33 and film take-up recess 35, and film supply spindle 37 is rotatably mounted in the center of recess 33 to receive the film supply spool. Slot openings 39 and 41, which border the center section of the front wall of casing body 21, in conjunction with a film pressure pad 40 biased by a spring 42 (see FIG. 4), act as film guides for positioning the film in proper relation to the camera's picture-taking axis 44 and the film driving claw 105 (FIG. 10) when the cassette is loaded and inserted in a camera.

Take-up spindle 43, which has a film-trapping slot 45, is rotatably mounted in the center of film take-up recess 35. Take-up spindle 43 has a saw-tooth clutch face 47 at one end which is accessible to and driven by the camera's spindle drive 104 (FIG. 10) through a suitable aperture in the bottom of casing body 21 (see FIG. 3). Similarly, supply spindle 37 also has a saw-tooth clutch face 49 at one end which is accessible through opening 51 in casing cover 23. It is by means of clutch face 49 that supply spindle 37 is driven by spindle drive 104 when the position of the cassette in the camera is reversed for purposes of rewinding the film on the supply spindle.

Referring now to the enlarged detail of the switch mechanism illustrated in FIG. 4, film sensor lever arm 53 is rotatably mounted on pivot 55 which is made of brass or other electrically conductive material and extends through the bottom of casing body 21 (see FIG. 3). Located at one end of lever arm 53 is a stud 57 and attached to it is one end of a compression spring 59 which biases lever arm 53 in a clockwise direction. Compression spring 59 is anchored against interior wall 61 of casing body 21, and at all times contacts post 63 which is made of brass or other suitable electrically conductive material and which also extends through the bottom of casing body 21 (see FIG. 3). Cut-off spring 65 is attached to lever arm 53 and is tensionally secured in a recessed portion of lever arm 53, being entwined between post 55, a stud 67, and the wall 69 formed by the recessed portion of lever arm 53. The spring bias of cut-off spring 65 causes it to normally contact that portion of compression spring 59 which is wrapped around stud 57.

So long as cut-off spring 65 contacts compression spring 59, a circuit is closed from post 63, through compression spring 59 aand cut-off spring 65, to pivot 55. This circuit is shown in FIGS. 5 and 6 which are simplified schematic diagrams of the general electrical circuitry of a camera and a cassette utilizing the switching mechanisms disclosed herein. The cassette, represented generally by block 71, may be inserted into the camera (represented by block 73) in a first position, which is illustrated at FIG. 5, and also in a second position as illustrated in FIG. 6. The camera contains the usual on-off switch 75 which permits the operator to selectively energize electric drive motor 77 from the power source shown as battery 79. However, this circuit is open at contacts 81 and 83 unless the cassette is in the camera. The cassette 71 is initially inserted into camera 73 in its first position illustrated in FIG. 5, and when in this position it can be seen that the circuit just described above (including post 63, compression spring 59, cut-off spring 65 and pivot 55 of the automatic switch assembly) normally provides the necessary path for completing the energizing circuit for drive motor 77.

After the camera operator has exposed the predetermined maximum amount of film, but before the trailer has completely unwound from the supply spool, the film stored in the take-up recess of the cassette causes cut-off spring 65 to be moved out of contact with compression spring 59, thereby opening the electric drive motor circuit and making it impossible for the operator to cause the last few feet of film trailer to be unwound from the supply spool. At this time the operator opens the camera, removes the cassette, and then reinserts it in its second or reverse position as shown in FIG. 6. In this position contact points 81 and 83 are contacted respectively by conductive rivets 85 and 87 (also shown in FIG. 3) which are electrically connected by shorting-bar pressure pad 89 (also shown in FIG. 1). This once again provides the necessary means to complete the energization circuit for motor 77, and, with the cassette in this position, the operator can selectively energize drive motor 77 by means of switch 75 to cause the film to be further exposed and/or be completely rewound onto the supply spool.

It is believed that the nature of the invention can be best understood with further description being set forth from the standpoint of operation, with particular reference being made to FIGS. 7, 8 and 9. To initially load film into a camera utilizing a cassette of the type disclosed herein, the operator opens the cassette, placing a supply spool 91 of unexposed film 93 over rotatable supply spindle 37 and into film supply recess 33 of the cassette casing body 21. The leader of the film 93 is then threaded simply through slot opening 39, across film pressure pad 40, and through slot opening 41, and the end of the leader is placed in film-trapping slot 45 of rotatable take-up spindle 43.

As can be seen from FIG. 7, this initial threading operation positions film sensor lever arm 53 so that its sensing toe 95 is contacting the non-emulsion side of the outer layer of the roll of film stored on supply spool 91. Contact between sensing toe 95 of lever 53 and the surface of the roll of film has been assured by the clockwise rotational bias which is applied to lever arm 53 by compression spring 59. It is this initial, operative position of lever arm 53 that determines the correct sensing position of cut-off spring 65.

Cut-off spring 65 is fixed to lever arm 53 in a predetermined relation, namely, so that for any given position of lever arm 53, the shortest distance between sensing toe 95 and the hub of supply spool 91 is always slightly greater than the shortest distance between cut-off spring 65 and take-up spindle 43. Thus, so long as lever arm 53 remains in its operative, i.e., initial, position in relation to the film reel stored on supply spool 91, cut-off spring 65 will contact the roll of film stored in take-up recess 35 before the film trailer has completely unwound from the hub of supply spool 91. The exact relation between cut-off spring 65 and lever arm 53 is designed to assure the maximum exposure of film 93 practicable without permitting the trailer of film 93 to completely unwind off supply spool 91.

However, since lever arm 53 would tend to move in a clockwise direction as the film 93 begins to unwind from the supply spool 91 to the take-up spindle 43, and since cut-off spring 65 moves with lever arm 53, it is essential that means be provided to maintain lever arm 53 in its initial position in which it has sensed the size of the roll of film stored on supply spool 91. Film sensor lever arm 53 is secured in its initial position in the following manner:

Referring once again to FIG. 4, stop lever arm 121 is rotatably mounted on pivot 123 which is suitably secured to the body of the cassette. A downwardly extending lip 125 of stop lever arm 121 engages the leading edge of lever arm 53, and whenever the cassette cover member 23 is in open relation to cassette body member 21, lip 125 is held against lever arm 53 by the influence of stop lever spring 127 which is secured at one end to stop lever arm 121 and presses against the trailing edge of lever arm 53. Stop lever spring 127 is designed to be lighter than compression spring 59 so that, while sufficient to hold lip 125 against lever arm 53, it does not interfere with the initial positioning of sensing toe 95 of lever arm 53.

As is shown in FIG. 1, switch mechanism cover 97 is provided with an arcuate opening 99 through which projects an extension 128 of stop lever arm 121. The relative position of extension 128 in opening 99 is determined by the position of stop lever arm 121 which, in turn, follows the position of film sensor lever arm 53. Therefore, when the film has been placed in the cassette initially and lever arm 53 is moved to its operative position by its sensing of the diameter of the roll of film stored on supply spool 91, stop lever arm 121 is moved to a limiting position. Thereafter, cover 23 of the cassette is closed, and this causes pressure pad 89 (which also serves as a shorting bar as discussed above) to press down upon the upper surface of extension 128. The friction between the surface of pressure pad 89 and the top of extension 128 is sufficient to overcome the force of springs 59 and 127 and maintains stop lever arm 121 in its limiting position as initially set.

The operator next opens hinged cover 102 of camera 73 (as illustrated in FIG. 10) and places the cassette in the cassette-receiving recess 103 so that the extending portions of pivot 55 and post 63 (see also FIG. 5) make electrical contact with contact points 81 and 83 within the camera body. As explained above, since cut-off spring 65 is in electrical contact with compression spring 59 at the point where both pass stud 57, the drive motor 77 of the camera can now be selectively operated by switch 75. When the cassette is placed in recess 103 in this position, saw-toothed clutch face 47 of take-up spindle 43 (also see FIG. 3) is engaged by the similarly saw-toothed face of the spindle drive 104, and film driving claw 105 can engage the perforations of film 93, spindle drive 104 and film-driving claw 105 being, respectively, suitably geared and cammed to motor 77. As the film is driven from the supply spool 91 and wound onto take-up spindle 43, it is maintained in proper relation to the camera aperture by means of film pressure pad 40 which is biased by spring 42.

Referring now to FIG. 8, when all of film 93 has been exposed except approximately three to five feet of trailer remaining on supply spool 91, the diameter of the roll of film which has formed around take-up spindle 43 in take-up recess 35 of the cassette is such that the non-emulsion side of the outer layer of the film reel contacts the sensing end of cut-off spring 65. This causes cut-off spring 65 to be moved out of electrical contact with compression spring 59 and opens the circuit connecting battery 79 and drive motor 77, and the motor can no longer be operated in response to the closing of on-off switch 75. In this manner, the disclosed switch mechanism automatically prevents the trailer of film 93 from unwinding completely off supply spool 91, and the film can now be rewound on supply spool 91 without necessitating the opening of the cassette in a darkroom.

At this time, the operator removes the cassette from the camera, turns it over, and reinserts it in the camera so that conductive rivets 85 and 87 now make electrical connection with contact points 81 and 83 in the camera body (see FIG. 6). The electrical circuit for drive motor 77 is now completed through contact 81, rivet 85, shorting bar 89, rivet 87 and contact 83. Drive motor 77 can once again be selectively energized by the closing of on-off switch 75 by the operator. In this reversed position, the exposed saw-toothed clutch face 49 of supply spindle 37 is engaged by spindle drive 104, and the film can now be rewound onto supply spool 91. It should be noted that in an 8 mm. movie camera this rewinding procedure would also include the exposure of the second side of film 93.

Since it has been found that a camera generally does not rewind the film on the supply spool as tightly as the film was initially wound thereon by the film manufacturer, it is preferable to completely disengage the switch mechanism from any contact with the film during the rewind. This disengagement has been provided for as follows: Referring once again to FIGS. 1, 2 and 3, the switch mechanism cover 97 has been provided with a second opening 107 through which protrudes knob 109 which is a vertical extension of film sensor lever arm 53. A recess 111 in cover 23 leaves knob 109 exposed when the cassette is closed (see FIG. 2). When the cassette is inserted in the camera in its second, or rewind position, knob 109 is contacted by a fixed stud 112 in the camera body (see FIG. 10) which causes lever arm 53 to be driven in a counterclockwise direction away from its operative position to the position illustrated in FIG. 9. Lever arm 53 is maintained in this withdrawn position until the cassette is removed from the camera. It should be noted that when the cassette is initially placed into the camera in its first position, necessary clearance for stud 112 is provided by a recess 113 in the cassette body 21 (FIG. 3).

Once the cassette is reinserted in the camera in its rewind position, the operator can selectively energize drive motor 77, and film 93 can be completely rewound onto supply spool 91. Following rewinding of film 93, or its rewinding and further exposure, the cassette may be removed from the camera, opened in normal light conditions, and the supply spool of exposed film can be simply removed for processing.

In the event that the operator may inadvertently insert the cassette into the camera initially in its inverted (rewind) position, i.e., with "side 2" up instead of "side 1," knob 109 of lever arm 53 is contacted by fixed stud 112, as just described, causing lever arm 53 to be driven away from its operative position. (See FIG. 9.) Attention is called to the fact that this movement of film sensor lever arm 53 is not followed by stop lever arm 121. Instead, the frictional pressure exerted on extension 123 of stop lever arm 121 by pressure pad 89 in the manner explained above (the cassette being closed at this time) maintains stop lever arm 121 in its limiting position as was originally determined by the operative position of film sensor lever arm 53 when set by the initial contact between sensing toe 95 and the surface of the roll of film stored on supply spool 91. Under these conditions, the rotational force imparted to lever arm 53 by fixed stud 112 as the cassette is inserted in this inverted position causes lever arm 53 to overcome the bias of stop lever spring 127 and move away from stop lever arm lip 125, distorting stop lever spring 127.

If the camera operator becomes aware of his inadvertent mis-insertion of the cassette before running off the film leader, he will probably remove and re-insert the cassette properly without reopening it. By virtue of the novel stop lever device disclosed herein, the cut-off switch mechanism will be reset automatically to its original position: namely, when the cassette is removed and fixed stud 112 no longer contacts knob 109, film sensor lever arm 53 is free to rotate clockwise under the combined influence of compression spring 59 and stop lever spring 127 until its leading edge once again engages lip 125 of stop lever arm 121 which has remained locked in its limiting position. This returns the switch mechanism to its operative position as illustrated in FIG. 7, and, following re-insertion of the cassette into the camera in its proper initial position, the operator can expose the first side of film 93 with the switch mechanism still properly set to assure that the motor drive will be cut-off in the manner described above before the trailing edge of the film has run off the supply spool.

Having described one specific embodiment of the present invention, it is desired that it be understood that this form is selected to facilitate in the disclosure of the invention rather than to limit the number of forms which it may assume; and, it is to be further understood that various modifications, adaptations, and alterations may be applied to the specific form shown to meet the requirements of practice, without in any manner departing from the spirit or scope of the present invention.

For instance, it should be obvious that the objects of the invention would be fulfilled by an embodiment modified as follows: Spring 127 could be secured to the cassette body and positioned to bias stop lever arm 121 in a clockwise direction. This would serve to hold stop lever arm 121 in engagement with film sensor lever arm 53 whenever the cassette were open, thus assuring that stop lever arm 121 would seek a limiting position in which it could be locked to limit lever arm 53 to an appropriate operative position in the event the latter were inadvertently withdrawn. In this proposed modification, spring 59 must be strong enough to overcome the influence of spring 127 so that film sensor lever arm 53 will seek its operative position in the manner explained above. Also when stop lever arm 121 is locked in its limiting position, modified spring 127 would not be effective and lever arm 53 would be biased toward the limiting position of stop lever arm 121 only by spring 59.

What is claimed is:

1. In a film cassette for insertion into a camera, said camera having motor means for driving film past an exposure aperture and including a spindle driving member, a film supply spindle for receiving a spool of film, a film take-up spindle to drivingly engage said spindle driving member when said cassette is inserted into said camera for taking up said film driven from said supply spindle past said exposure aperture by said motor means, and a film sensor movable to and from an operative position in accordance with the amount of film stored on said spool when said spool is initially received by said film supply spindle, the improvement comprising: a stop member movable to and from a limiting position in which it limits movement of said film sensor into its operative position, connecting means biasing said film sensor into engaging relation with said stop member for causing said stop member to be positioned in its limiting position in response to said film sensor moving into its operative position and allowing said film sensor to move from its operative position independently of said stop member when said stop member is held in its limiting position, and means for locking said stop member in its limiting position.

2. A film cassette according to claim 1 wherein said connecting means includes a spring, and wherein said film sensor is influenced by said spring for movement in at least one direction, said direction being toward a position of engaging relation with said stop member.

3. A film cassette according to claim 1 wherein said cassette comprises a casing including two members movable between open and closed positions, and wherein said stop member is movable to and from its said limiting position when said casing members are open, said stop member being locked in said limiting position when said casing members are closed.

4. A film cassette according to claim 1 wherein said stop member includes a stop lever arm and a spring, said spring influencing said stop lever arm into engaging relation with said film sensor.

5. A film cassette according to claim 1 wherein said cassette may be inserted into said camera alternatively in first and second positions, and wherein said film sensor is disengaged from said stop member and moved from its operative position when said cassette is in said second position.

6. In a film cassette for insertion into a motion-picture camera,
   (A) said motion-picture camera having:
      (1) a source of electrical power,
      (2) electrical motor means for driving film past an exposure aperture and including a spindle driving member, and
      (3) a motor circuit connecting said motor means and said power source and including first switch means for selectively opening and closing the same;
   (B) said cassette comprising:
      (1) a casing formed by two hinged members movable between open and closed positions,
      (2) a film supply spindle for receiving a spool of film, and
      (3) a film take-up spindle to drivingly engage said spindle driving member when said cassette is inserted into said camera for taking up said film as it is fed from said supply spool and past said exposure aperture by said motor means,
      (4) a film sensor movable to and from an operative position wherein it contacts the periphery of the roll of film on said supply spool, said film sensor being normally biased into said operative position,
      (5) secondary switch means connected into said motor circuit in series with said first switch means when said cassette is inserted into said camera and responsive to the position of said film sensor, said secondary switch means being
         (a) movable between first and second positions,
         (b) normally biased to said first position to close said motor circuit, and (c) disposed in relation to said take-up spindle to cause said secondary switch means to be moved to its second position to open said motor circuit whenever a predetermined amount of said film has been taken up on said take-up spindle, the improvement comprising:

(C) a movable stop member biased into engaging relation with said film sensor to be moved thereby, during the time said hinged casing members are open, into a limiting position when said sensor moves to its operative position, and (D) means for locking said stop member against movement in its limiting position when said hinged casing members are closed.

7. A film cassette according to claim 4 wherein:

(A) said cassette may be inserted in said camera alternatively in first and second positions, (B) said film supply spindle drivingly engages said spindle driving member when said cassette is inserted into said camera in said second position, (C) said secondary switch means is only operative when said cassette is in said first position, said cassette including:

(D) shorting-bar means operative only when said cassette is in said second position for completing said motor circuit to cause said film to be returned and stored on said spool by said supply spindle in response to the selective operation of said motor means, and said camera including:

(E) film sensor blocking means responsive to the insertion of said cassette into said camera in said second position for causing said film sensor to be disengaged from said stop member and moved from its operative position whereupon said second switch means is moved to said second position.

References Cited in the file of this patent

UNITED STATES PATENTS

| | | |
|---|---|---|
| 2,080,086 | Mihalyi | May 11, 1937 |
| 3,051,405 | Lyon | Aug. 28, 1962 |